United States Patent
Heckman et al.

[11] Patent Number: 5,875,431
[45] Date of Patent: Feb. 23, 1999

[54] LEGAL STRATEGIC ANALYSIS PLANNING AND EVALUATION CONTROL SYSTEM AND METHOD

[76] Inventors: Frank Heckman, 4724 Thurston Pl., San Diego, Calif. 92130-1339; Stuart E. Rickerson, P.O. Box 2743, Del Mar, Calif. 92014-5743; Bruce Kauffman, 4570 Fairway Dr., Rohnert Park, Calif. 94928; Miles Zaremski, 820 Great Elm La., Highland Park, Ill. 60035-4074

[21] Appl. No.: 617,527
[22] Filed: Mar. 15, 1996

Related U.S. Application Data

[60] Provisional application No. 60/011,249 Feb. 6, 1996 and provisional application No. 60/011,873 Feb. 17, 1996.
[51] Int. Cl.$^6$ .................................................... G06F 17/60
[52] U.S. Cl. ...................................... 705/7; 705/8; 705/11
[58] Field of Search .................................. 705/1, 7, 8, 11, 705/9, 30, 35, 400; 707/100, 104; 235/375

[56] References Cited

U.S. PATENT DOCUMENTS

| | | | |
|---|---|---|---|
| 5,159,180 | 10/1992 | Feiler | 235/375 |
| 5,175,681 | 12/1992 | Iwai et al. | 705/9 |
| 5,182,705 | 1/1993 | Barr et al. | 705/11 |
| 5,329,447 | 7/1994 | Leedom, Jr. | 705/9 |
| 5,557,515 | 9/1996 | Abbruzzee et al. | 705/9 |

*Primary Examiner*—Stephen R. Tracs
*Attorney, Agent, or Firm*—Oppenheimer, Wolff & Donnelly, LLP

[57] ABSTRACT

This invention is directed to a strategic planning control system, and more particularly to a computer-based, closed-loop legal strategic planning system and method having iterative convergence to an optimal strategy and dynamic tracking of current prevailing legal climates. The system of this invention includes a computer-generated legal strategy for streamlining the legal process by converting it from a traditional task-oriented system to a process-oriented system. By so doing, predetermined objectives and tasks are defined according to a disciplined time schedule, cost targets are defined, and deliverables agreed upon prior to beginning the legal process. A key aspect of the system and method of this invention is a series of computer programs which provide a strategic planning template outlining the objectives and tasks, and their associated timing. The template is case category and case type specific and presents the "best practices" strategic process from which to launch a legal action. The "best practices" are taken from previously concluded well managed cases having a similar case category and case type as the instant case, and which have been identified as paradigms. Three closed-loop control systems are integrated into the system and method of this invention for dynamically monitoring and measuring legal cost reporting and billing, for dynamically monitoring and measuring attainment of objectives and milestone tasks, and for dynamically measuring and controlling the deliverables derived from the timely completion of the legal objectives and tasks. These control systems have special features for maximizing the likelihood of a desired legal outcome, increasing legal productivity, minimizing the cost to achieve that outcome.

9 Claims, 6 Drawing Sheets

LEGAL STRATEGIC ANALYSIS PLANNING AND EVALUATION CONTROL SYSTEM AND METHOD

CROSS REFERENCE TO RELATED PROVISIONAL APPLICATIONS

This invention is related to provisional application, Ser. No. 60/011,249, filed Feb. 6, 1996, and to provisional application, Ser. No. 60/011,873, filed Feb. 17, 1996 now abandoned, both of the same title ad both filed pursuant to 35 U.S.C. 11(b) and Rules 51 and 53, the benefit of whose filing dates is claimed.

DESCRIPTION

1. Technical Field

This invention is directed to a strategic planning control system, and more particularly to a computer-based, closed-loop legal strategic planning system and method to provide a computer-generated legal strategy having a plurality of closed-loop control systems. These control systems have special features for maximizing the likelihood of a desired legal outcome, increasing legal productivity, minimizing the cost to achieve that outcome. The invention is also directed to computer programs and methods for computerized management of legal activities associated with litigation and legal transactions, including computer-based systems for dynamically monitoring and measuring legal cost reporting and billing, for dynamically monitoring and measuring attainment of objectives and milestone tasks, and for dynamically measuring and controlling the deliverables derived from the timely completion of the legal objectives and tasks.

2. Background Art

Each year in the United States, over 85,000 medical malpractice claims are initiated and just over 24,000 claims are settled with indemnity payments totaling $3.8 billion. On top of that, expenses related to the defense of all these claims total over $1.1 billion a year. An estimated $995 million goes to approximately 1,000 law firms (nationwide) who specialize in medical malpractice defense. Of this amount, over 70–90% consists of lawyer fees for services. Beyond medical malpractice, the direct cost of product liability litigation in the U.S. has been estimated at $100 billion or more, of which defense costs are in excess of $30 billion. These two types of litigations are just systematic of the high and uncontrolled cost of litigation and of the cost and control of legal activity more generally.

Medical malpractice and products liability are in an increasingly complex litigation system and technically difficult area. They require the services of high-quality, and therefore high-cost, counsel. As reported by David Royalty at the Association of Southern California Defense Counsel's Annual Seminar, Feb., 1995, Los Angeles, a number of insurance and other sources have reported skyrocketing personal injury defense costs with annual increases in the area of 15% to 23%. The causes of the increased complexity, technical difficulty, absence of productivity tools and high cost are not immediately apparent. Industry observers have commented on expanded theories of liability, greater scope of compensable injuries, the direct and indirect impact on standard of care of expanded and new technology, and use by plaintiffs of practice guidelines as standard of care indicators.

Clients and lawyers talk about the above issues, but there appear to be few realistic alternatives. Recent positive developments include recommendation and approval of the use of task-based billing by the American Bar Association's (ABA) and The American Corporate Counsel Association (ACCA).

It is widely believed that if litigants and their law firms would share information, forms, research, and the like (instead of reinventing the wheel for each claim), savings of at least 20% per annum could be possible. (France, Reengineer Your Lawyers, Forbes ASAP, Jun. 6, 1994, p.54).

Too often, law firms and their clients tend to react rather than to plan. Many lawyers prefer commencing their representation as a party's counsel with work tasks rather than spending the time to plan and to set objectives. This lack of strategic planning costs millions each year in unfocused or unnecessary legal tasks, and in resultant higher settlements.

Techniques and practices that stimulate efficiency in other industries are not applied in the legal arena. Lawyers and claims professionals do not use project management techniques and strategic planning, claiming that their work process is too complex, too subjective and too unpredictable. The practice of law, they claim, is an "art", not a service. They do not want to be "micro-managed" by their clients or "second-guessed" by after-the-fact legal auditing services. However, there is recognition by the ABA and ACCA that guidance, in the form of "best practice" guidelines or ABA recommendations, are needed. See American Bar Association, Committee on Corporate Counsel, Task Group on Products Liability Management (Reengineering), unpublished proceedings. The ABA's process is yet in the formative stages.

SUMMARY OF THE PROBLEM

Medical malpractice cases, as exemplary of several fields including products liability, environmental remediation, intellectual property and similar cases are complex processes, with divergent needs and agendas. Goal setting is largely subjective. Due to the need to control operational costs, claims staff sizes are such that many claims professionals unintentionally delegate management to defense counsel. Defense counsel are especially resistant to change. At best, clients must rely upon historical cost patterns or subjective assessments based on anecdotal experience to determine what might be acceptable baseline cost. They do not have access to task based data from which they can assess the cost benefit of legal services, and from which they can reasonably predict future costs.

SOLUTION ATTEMPTS

The insurance industry and self-insured companies have made attempts to solve some of the problems. Unfortunately, these actions either are too general, limited in scope or length, misdirected, or based upon faulty assumptions and have generally been unsuccessful.

Associations such as the International Association of Defense Counsel (IADC), the Federation of Insurance and Corporate Counsel (FICC), the Defense Research Institute (DRI), ABA, and ACCA provide opportunities for dialogue and exchange of professional information. They, along with insurers and lawyers, routinely conduct seminars and workshops for specific high damage potential areas such as birth brain injuries. However, these provide information that is usually too general in scope, and often they are not based upon effective teaching techniques. They are usually intended to increase the referral business or professional stature of the speaker(s), not to improve productivity or outcome(s). Finally, there is no follow-up to check on implementation or results.

Some insurers and clients have issued litigation protocols, guidelines or directives. While helpful, these step-by-step directions have limits. They require the same tasks whether or not these tasks may be appropriate in context of a specific case. Lawyers view these guidelines as telling them how to practice law, or as they call it, "micro-management," rather than the communication device they are intended to be. Lawyers feel that they have no input or control. See Arthur Anderson/Corporate Legal Time Survey, Jul. 1994, pg.1.

Although there are recent improvements, these sources of defense information are in paper formats, users cannot readily convert them to computer format and they often do not address the needs.

Research conducted by American Health Services, Inc. has shown that most organizations are attempting to fix the process by concentrating on technology. Clients have used the following methods and services:

E-mail with client on-line to its law firm's billing system;

Sharing of legal personnel between client and law firm; and

Various forms of billing management software.

Other organizations report turning to their lawyers to discount their rates or to give them fixed fees as a way to better predict costs or retard their increase. These measures have proven inadequate at best. For the most part, billing practices remain unchanged although access to incomprehensible data may be facilitated. Further, the client is still left unsure as to which legal services were necessary and which added no value or were inappropriate, and whether the costs are reasonable.

Today, many companies face similar issues, albeit usually on a relatively smaller scale:

Litigation costs are high;

It is hard to measure results;

Company law departments face a huge volume of paper generated each month in outside counsel billing statements;

The billing data is mostly uninformative;

Too much lawyer time is spent analyzing legal statements;

That time spent is essentially unproductive, and it could be better spent on other strategic or urgent tasks or, for outside counsel, billed out on other matters;

Trying to determine what all this data means is difficult, if not impossible;

Billing issues and errors often are undetectable in the mountain of paper;

It can be a challenge, monthly or quarterly, to determine if any real value is being added by all this effort;

Remembering what has been done in an earlier period requires a memory expert;

The analysis performed in any given month rarely relates to earlier periods; and Frequently there is no way to identify if research of similar issues and problems has previously been done and paid for.

Litigators use the terms, "strategic planning" or "strategy" synonymously with preparing the case as a lawyer or as part of a short-term scheme to settle a case. Too often the "plan" has more to do with reacting to external factors, e.g., court or other deadlines, demand(s) of the other side, and the like, and little to do with "strategic planning." In fact, the entire infrastructure of the legal world (lawyers, clients, and the courts) poses substantial barriers to the proactive activities that are an integral aspect of a strategic plan. The present system is enmeshed with the court system, which creates substantial constraints to strategic planning. Calendar conflicts, uncertainty of court rulings on substantive issues, and multiple parties, all with their own, often conflicting agendas, combine to inhibit planned and orderly activity. High-damage litigation typically presents even more barriers to formation of case management strategies. The complexity of high-damage litigation and the risk of exposure to multimillion dollar verdicts yield an almost overwhelming impulse to become task-oriented versus process-oriented.

There are several reasons for changing the approach to high-damage litigation cases or other high value legal activity from a task-oriented approach to a process-oriented approach. First, even if current ways of preparing and trying cases seem to produce "acceptable" case outcomes, no one doubts the value of at least examining new tools, particularly when such tools have proven successful in other industries. Second, with the dollars in the centa-billions, improving productivity could result in multi-billion dollar returns. Third, multimillion dollar verdicts continue to occur, with increasingly unpredictable upper-end ranges, casting well-founded doubt on the efficacy of the present methodology. Fourth, the pressure to contain defense costs is increasing, requiring new, more efficient ways to define all cases, yet with acceptable outcomes. Fifth, the pressure to contain defense costs collaterally creates a need to document and to demonstrate effective case management; what works needs to be documented and validated. Finally, clients are increasingly dissatisfied with the problems and constraints of the legal system being cited, per se, as reasons against attempting change.

The work needed to litigate a case is often seen as one task after another, each task being in reaction to actions brought by the opposing side in the case, with each task needing completion before one can move on to the next. Consequently, where case management is seen as simply completing a series of tasks without advanced planning, results often become myopic. This narrow focus may prevent the defense team from perceiving the tactical value of a different order of work activities. For example, a review of medical records should precede an interview with a medical witness.

Many clients complain that attorneys tell them that an effective strategy cannot be formed until all basic work is more or less complete. If this were true, planning would not be possible until close to the end of the life of a case. The implication is that a litigation defense team can only react to developments. Delaying key legal management decisions indefinitely almost totally cedes case control to the other parties in the matter. Failure to establish control over the direction of a legal matter early in the case allows the plaintiff or other parties to usurp control and direction of case development. Accordingly, there is a need for a better approach to managing litigation and other legal matters, cost control, and outcome prediction and evaluation.

DISCLOSURE OF INVENTION

Objects And Advantages Of The Invention

Accordingly, it is an object of this invention to provide a closed-loop strategic planning system with the advantage of maximizing the likelihood of a desired legal outcome in connection with a legal action.

It is another object of this invention to provide a closed-loop cost management and control system for measuring and controlling legal costs associated with a legal action with the advantage that it is easily understood and tracked by the purchaser of the legal services, the cost control system being integral to the closed-loop strategic planning system and working in cooperation with the strategic planning system.

It is another object of this invention to provide a closed-loop litigation control system for measuring and controlling the timely completion of the objectives and tasks identified by the strategic planning system with the advantage of ensuring that all predetermined objectives and tasks are completed on schedule.

It is another object and advantage of this invention to provide a closed-loop legal performance control system to assess the quality of deliverables previously identified with and correlated to the completion of the predetermined objectives and tasks identified by the strategic planning system of this invention, the assessment being made by comparing the deliverables produced to benchmarks.

It is another object and advantage of this invention to provide a computer system having encoded therein a software program for enabling an iterative, interactive closed-loop legal strategic planning system to produce a legal strategic plan to maximize the likelihood of attaining the desired outcome to the case, and for establishing closed-loop control systems for controlling the timely completion of legal objectives and tasks, for controlling costs associated with the completion of these objectives and tasks, and for controlling the quality of deliverables resulting from the completion of these objectives and tasks.

It is another object of this invention to provide a method for strategically planning the objectives, tasks, and activities associated with a legal action so that the likelihood of the desired outcome of such legal activity is maximized and the cost of achieving the desired outcome is minimized.

BRIEF DESCRIPTION OF DRAWINGS

The subject matter which the inventors feel is their invention is disclosed in the specification and in the drawings as follows.

Figure 1:
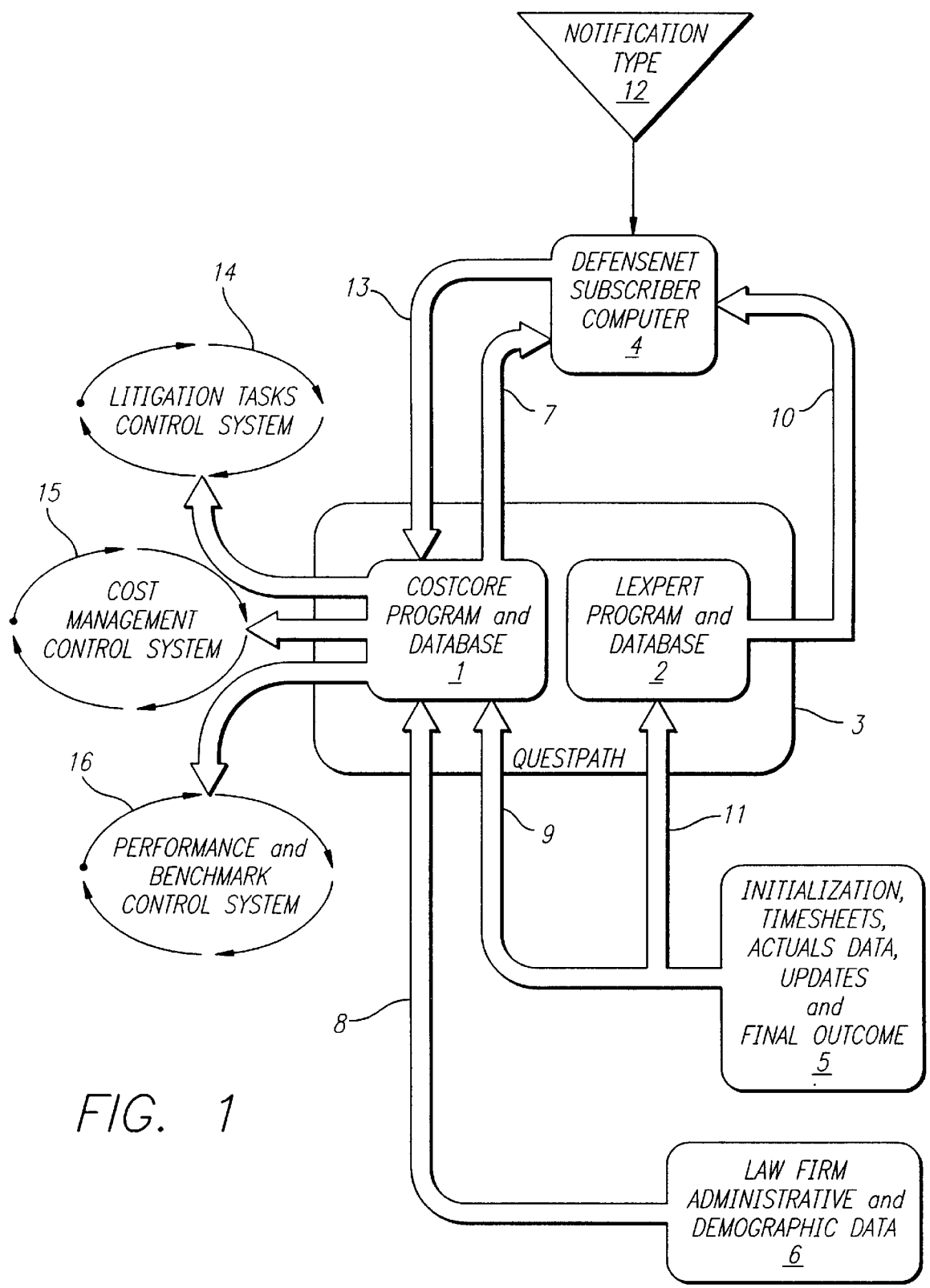
FIG. 1 is a schematic drawing of the system of this invention showing the relationship of the computer programs necessary for effectuating the system, with the Service Provider, initialization data, and the three resulting control systems.

SUMMARY OF THE INVENTION
I. OVERVIEW.

The invention comprises an outcome-oriented, multi-element, single and multi-case strategic legal activity or litigation case planning and control system and process having the major elements discussed below. Strategic legal activity or litigation planning aspects of the invention involve defining the most cost-efficient process by which a defined, acceptable case outcome may be obtained. The strategic case plan of the invention states the decision of the litigation team on long-term goals and short-term objectives, describes the path of development of the litigation process and associated costs, and identifies the desired result. Accordingly, in litigating high-damage cases, a strategic plan can be adopted to control case development such that changes of the desired case outcome are maximized.

A feature of the Strategic Planning system of this invention in that the final outcome of the plan may be used as feedback to provide updated information resulting in a better strategic plan when another legal case arises having a desired outcome and case type similar to the case just completed. Accordingly, the strategic planning system and process of this invention is an iterative system and process, whereby the ability of the system and process to provide the "best" legal strategic plan to achieve a desired outcome is enhanced as completed cases are analyzed. The system is also dynamic in that any shifts in the legal climate will be reflected in the actual outcomes of the completed cases. Accordingly, the system of this invention iteratively converges on "best practices" as identified in well-managed paradigm cases, and is able to dynamically track any changes to the currently prevailing legal climate.

A key aspect of the strategic planning aspect of the invention is the concept of "leverage," which is descriptive of those activities intended to acquire an advantage over other parties to the legal matter or litigation. Leveraged activities are typically planned activities resulting from a well thought out strategy and characterizes a "process-oriented" litigation or transaction approach. Almost always, increasing leverage over other parties or opponents decreases potential loss exposure and costs of litigation. By comparison, the traditional task-oriented approach typically results in reactive responses to activities undertaken by the opposing side, thus precluding engaging in activities that are proactive towards achieving the desired outcome. The strategic case development planning system of this invention formalizes leverage strategies and places tasks proactive to case development into a structure such that there is progress toward the desired goal. Strategic plans need not be complex. Strategy is more effective if it can be succinctly stated and its degree of implementation and performance can be measured objectively over time. The details are contained in supporting work schedules or plan subparts.

The process to develop the strategic legal services plan of the invention, whether it is litigation, a transaction, dealing with governmental bodies or the like, requires formulation of short-term objectives and long-term goal(s). It requires identification of milestones against which one can measure progress toward the objectives. Benchmarks or standards established by what such activities have comprised or produced in the past, may be used as a basis for determining what activities should be undertaken to achieve the stated goals. A short-term objective is a specific desirable result of one or more case development activities that is intended to occur within a designated time. Milestones are events that culminate in objectives. They signal progress toward the objective. The process defined by the strategic plan of this invention produces a pathway through the case. Once this path has been identified, deviations destructive to progress are more easily detected and avoided. Activity that suggests itself or is recommended to the legal team can be examined in terms of the likelihood that it will advance the case toward the long-term goal.

Complex legal activities, exemplary among them being high-damage litigation, increases the tendency for legal counsel to default to a task orientation, and resulting in a reluctance to engage in an examination of current case management methodologies. This often prevents counsel from fulfilling its role, and compromising achievement of the desired case outcome. One way to structure case management so that strategies are emphasized is to form strategic case plans. Strategic case plans consist of an accurate assessment of a case's potential opportunities and weaknesses. This assessment includes aspects both internal and external to the case, delineation of roles and functions of each member of the defense team, cost and fee projections, short-term objectives, progress milestones, and evaluation of resources. Accordingly, the following are elements of a legal or litigation strategic plan of the invention.

A. Setting the Long-Term Goal.

As the first step in compiling a legal services strategic plan, the legal team must determine the case category, case type and scope of legal protection demanded. The case category is the general area of law involved in the case; e.g., intellectual property, construction, product liability, environmental, and the like. Case type refers to the type of legal action sought; e.g., patent infringement, medical malpractice, breach of contract, etcetera. The scope of legal action demanded is dependent upon the type of notice. For example, legal notification might be categorized into one of three groups:

(1) Internal notification whereby an injury or harm is reported within the organization, no outside agency or claim has been submitted, and the injury or harm is such that it might lead to a possible lawsuit;

(2) External Notification whereby the client is informed by an external agency of a reported injury or harm, and the injury or harm is such that it might lead to a lawsuit; and (3) Legal notice whereby the client is informed that he has been joined in a lawsuit.

Further, the legal team must decide upon the desired outcome (i.e., the long-term goal) and the acceptable level of risk, or uncertainty, permitted as it can affect the cost of delivery of the service. Before the legal team can select the long-term goal, it must conduct a basic investigation in the form of brief interviews with key witnesses, experts, and/or technical personnel; concomitantly, a review of any records must be done. When these tasks are completed, the legal team can use the steps below to select the long-term goal. Although there is an interrelation among the steps, each is conceptually distinct and straightforward.

Step 1: Perform a structured, or "triage-type," analysis to decide whether the case is defensible or meritorious; unusual or straightforward; and potentially precedent setting or routine. The results of the basic investigation will usually be sufficient to permit a rough determination of exposure or liability, including exposure to legal costs. At this point, only a rough determination is needed.

Step 2: Estimate the total settlement value in global terms, assuming contribution from all codefendants. This is a general estimate, not the more accurate settlement recommendation that occurs later in the case.

Step 3: Estimate the proportion of the total settlement amount that the client may realistically be called on to contribute.

Step 4: Predict the year in which settlement is likely to occur. It may be useful to complete Step 5 prior to completing this step.

Step 5: On the basis of knowledge of the jurisdiction in which the case is venued, establish a reasonable expectation of the year in which trial is likely. Because more than 90% of all high-damage cases settle, and most of these settle just prior to trial, this provides a predictable rough limit on the time available for case development.

B. Summary of Case Facts and Material Issues.

This section contains a one- or two-page "snapshot" summary of the salient facts of the case that are sufficient to support exposure or liability, an analysis of damages, and the formation of a forecast. It concludes with a list of material issues and summaries of their merit together with a brief description of damages. This section should also include unusual features of the case, such as alleged record alterations potential for publicity or notoriety, or other factors that may materially distort verdict potential or case value. The conclusion of this section should set forth the long-term goal, the type of case or area of relevant law, and specific legal theories upon which recovery might be sought. In a transactional legal action, the likelihood of the desired transactional outcome and means for attaining that outcome might be the conclusion of this section.

C. Venue.

The court system in which the case will be adjudicated should be briefly described, including commentary on the court calendar, average time from filing of the lawsuit to trial; characteristics or "track record" of the trial judge (if known); the judge's degree of plaintiff or defense orientation, if known, and general demographics of any unusual local court rules. All conditions that present clear benefits or disadvantage for the case should be highlighted. The section may conclude with a statement summarizing the impact of the jurisdictional conditions, such as: "[Name of court] will present no particular advantages and impose no unusual hardships for the defense, or "[Name of court] is distinctly plaintiff-oriented, with a jury pool composed jurors who traditionally have rendered extremely high verdicts."

D. Current Case Development.

This section includes identification of the developmental stage of the matter or case: basic investigation complete, but not yet in litigation; complaint served, but discovery not under way; preliminary discovery completed; etc. A statement summarizing the scope and breath of recommended discovery, but without itemization of each item needed to completed discovery, should be included. For example, a typical high-damage case might require the following statement: "The number of defendants, multiple medical specialties, and the reported extensive injuries of the plaintiff will require intense and complex discovery over the next two years. This level of discovery will provide the best information upon which we can focus necessary leverage that will support our preliminary goal of settling at less than [target amount]."

A one- or two-sentence description of the time constraints on discovery and defense preparation, such as court-mandated discovery cutoffs and limitations, early stage discovery moratorium for Early Neutral Evaluation, or court mandate travel requirements and special needs to prepare evidence for trial or discovery, should be set forth. Also, unusual case constraints, such as an actual or likely preferential trial date, should be highlighted. This supports unusually high cost factors or may emphasize the need for accelerated case development.

E. Staffing for Case.

Members of the defense team and their functional roles are identified here, including a brief statement acknowledging any case-specific instructions or constraints from the client or the claims professional. Identifying the staff facilitates planning in terms of who is authorized to submit billing charges against the case, as well as permitting the calculation of workload and blended cost targets for each activity undertaken to complete the objectives and tasks defined by the strategic plan.

F. Management Tasks: Assignments.

Here it is clearly stated who will be responsible for overall matter or case management and who will be responsible for completion of identified phases of case development. If any individuals are new to the team, the benefits and limitations of their inclusion will be briefly described. Also, prospective vendors other than those for routine, expected services, such as deposition transcription services, medical record photocopy services, economists, jury consultants, and the like, are identified and described. An example of a vendor whose services and/or product might be costly is one for creating demonstrative evidence, such as computer animation of a medical, surgical or technical procedure, explanation of complex technical concepts, testing or the like. Services of an independent investigator may or may not be considered a major cost item.

G. Projections of Legal Fees and Costs.

This section summarizes projections or "forecasts" for defense fees and costs, using the following subheadings:

Average cost up to trial for similar cases;

Projected fees and costs up to trial;

Projected settlement value or likely verdict amount; and

Ratio of projected case cost up to trial to estimated settlement value or likely verdict amount.

H. Objectives.

This section of the legal activity/litigation business plan sets forth the primary short-term objectives in the development of the case (including timing), the relationship between anticipated steps in preparing and litigating the case, accumulating leverage, and objectives that may be collaterally related to the particular case. In addition, this section commences the relationship between tasks and cost. From the material in this section, defense counsel will formulate specific work plans for accomplishing discovery or other case development tasks.

The legal activity/litigation plan should present concise, short-term objectives in a readily understandable format; e.g., tabular format. Examples include distinguishing the impact of various theories of liability on the exposure of the case, limiting damages to temporary injuries only, or identifying plaintiffs who have only limited rights of recovery.

Short-term objectives may be identified as either required in that it either a requisite procedural task or one that is responsive to an action initiated by opposing counsel, or, to be of value, a "leveraged" task. A task is leveraged task in the sense that it not absolutely certain that performance of that task will provide a strategic advantage, but only to the extent that there exists a likelihood, based on correlating past outcome to similar tasks and activities, of an incremental strategic advantage gained from completion of that task or activity. A leveraged task either takes advantage of a case's strength or is designed to remedy a potential weakness to result in a better negotiating position, reduced liability, or a savings in cost. In its most simplistic sense, leverage may be conceptualized as spending one dollar now to realize a savings of fifty dollars later. In other words, it is a proactive task which moves the case closer to the desired outcome. Leverage also has a time element, in the sense of its representing a window of opportunity. Short-term objectives have similar limitations. Each must directly relate to the long-term goal. The short-term objectives form the path of the plan's critical development. Examples are to establish plaintiff's potential for rehabilitation prior to taking a deposition, or to reduce the credibility of plaintiff's expert by demonstrating that his or her opinions are based on personal experience rather than community practices.

I. Milestones in Case Development.

Failure to meet one or more objectives may be fatal to achieving the long-term goal. However, progress indicators, milestones, are the safety net. They signal progress toward the objective or warn of deviation from the plan. For examples, milestones for a primary short-term objective of reviewing medical records might be obtaining copies of plaintiff's current medical records, retention of a rehabilitation expert, or arranging for the expert's independent examination of the plaintiff. If these milestones do not occur within expected times, it is unlikely that the defense team can achieve the short-term objective within the time needed to move the case toward the long-term goal.

J. Collateral Objectives.

Short-term objectives can also serve needs that indirectly relate to the subject case. An example is the goal desired of a defense team to establish a reputation that it hopes will be perceived as well-reasoned, credible and fair. Therefore, some short-term objectives may create general leverage or may take advantage of leverage previously created on another case. Consistent use of strategic legal activity/litigation plans will always result in general leverage, as other parties recognize that the legal team has become a more formidable opponent based on its planned approach to cases.

K. Flexibility of Short-Term Objectives.

This section of the business plan should set forth projected needs for contingency planning. Making objectives as flexible as possible will prevent total revamping of the plan because of unforeseen events. The most often cited example is in the area of expert witnesses. Working from the most to the least desirable, the legal team can create a list of experts. In the event of problems, e.g., experts unavailable or wrong mix of qualifications, the solutions exist at the time the problem arises: select a new witness from the list and adjust the long-term goal, if necessary.

L. Impact of Resources on Short-Term Objectives.

This section of the legal activity/litigation plan acknowledges that resources such as time, personnel, and money, are limited. The nature of time and money is obvious. Some human resources are obvious, but some require thinking through the various problems that can occur during a case. For instance, an objective may require involvement of an often-used expert witness. If the expert's calendar is congested and access to his or her services is limited, the chances of achieving the objective are similarly limited. Objectives must also be feasible. Available resources must be sufficient not only to allow the work to continue toward the objective, but also to permit modifications of the plan where appropriate.

THE STRATEGIC PLANNING PROCESS

The case development process of the invention can be conceptualized as an epi-circle on a circle. The epi-circle, labeled Strategic Planning Process, contains several elements, or steps. The first, Structured Analysis, consists of comprehending written and oral information in terms of identifying legal and factual issues. To a lawyer, the term "issue" is a statement that implies a need for confirmational support for the statement's evidentiary or legal basis, or refutation of validity of the statement. As a threshold to determining the legal and factual issues, the legal team must determine the case category, case type and scope of legal protection demanded. As explained supra the case category is the general area of law involved in the case; case type refers to the type of legal action sought; and legal notification quantizes the scope of legal protection demanded by categorizing the notification into one of three types:

(1) Internal notification whereby an injury or harm is reported within the organization, no outside agency or claim has been submitted, and the injury or harm is such that it might lead to a possible lawsuit;

(2) External Notification whereby the client is informed by an external agency of a reported injury or harm, and the injury or harm is such that it might lead to a lawsuit; and (3) Legal notice whereby the client is informed that he has been joined in a lawsuit. Based on this analysis, a desired outcome, or long term goal, and legal theories consonant with the facts of the case are set forth.

The second element of the strategic planning process uses the desired case category, case type and legal notification type as input variables to identify the appropriate baseline template on which to model a strategic legal process. The template is a predefined set of process steps for a given case category and case category type, and is based on the processes used in paradigm case of similar case category and type that have successfully attained their long term goals. The baseline template includes specific objectives and milestones, their respective timing, the deliverables resulting from their completion, and cost targets associated with their execution that are consistent with the input variables: legal category, type, and notification. The baseline template is merged with data that is specific to the present case and with data for the law firm selected to handle the case to provide a preliminary, case specific strategic "forecast." This strategic forecast provides the framework whereby the objectives sought, the costs incurred and the deliverables expected might be defined in greater detail and agreed upon by both client and legal counsel. Accordingly, the preliminary forecast is reviewed, adjustments made to the objectives, timing targets, deliverables, and cost targets to reflect extraordinary aspects of the case or jurisdictional peculiarities, and, finally, approved by the parties in the case.

The third element is execution of the predetermined objectives and tasks of the strategic plan. Data regarding on-going completion of the predetermined objectives and tasks, the actual times to complete them, the actual costs to complete them, and the deliverables produced is accumulated.

The fourth element in the strategic planning process includes an interactive review of the data accumulated in the third execution step and comparing this actual data with the target values set out in the second element, described above. Deviations regarding completion of objectives and tasks, scheduled completion times, costs of completion, and deliverables from the target values are noted. Interactive review refers to accumulation of potential oral or documentary "proof" or evidence as part of the process of testing initial issues. If the interactive review indicates a deviation from the original factual and legal issues as originally identified, then that part of the analysis must be reviewed for appropriateness in light of the desired outcome and in view of the unforeseen circumstances. In summary, the forecast can be revised to reflect the changes in circumstances.

The fifth element presumes that the factual and legal issues are still intact. The impact of the variances identified in the fourth element are ascertained and a decision made as to whether the variance represents either a systematic problem in the execution of the strategic plan, or whether the variance might be attributed to random events that are unlikely to be repeated. For those variances determined to result from a systematic underlying problem, the owner of the problem (i.e., person best able to resolve the problem) is identified, causality for the variances is determined, and solutions to the causality proposed.

Outcome Modeling is the sixth element of the epi-circle and comprises using information gained during the Structured Analysis and Interactive Review steps to predict possible interim issue resolutions or final legal outcome. As mentioned above, if the interactive review indicates a deviation from the original factual and legal issues as originally identified, then another Structured Analysis might have to be performed and the case re-reviewed.

We have now come full circle in our closed-loop strategic planning process. If Outcome Modeling indicates a long term goal within the range of desired outcomes, then only a few, if any, modifications to the strategic plan or its components are needed. Target values for objectives and tasks, their timing, their costs, and deliverables may be adjusted to reflect shifts identified in the Outcome Modeling step to the long term goals. Alternately, target values may be adjusted to reflect unresolvable variances identified in the Interactive Review step. In any event, the closed loop nature of the strategic planning process automatically provides a mechanism for testing initial assumptions and issues, for providing feedback on deviations from predetermined target values, and for refining target estimates.

As a practical matter, the Strategic Planning process defined above involves the transfer of a massive amount of information between the client and the legal counsel. Necessarily, the information must be in a form that clearly and concisely presents the information desired for that particular element of the Strategic Plan so that decisions based on that information might be made promptly and in an informed manner. In order to timely provide such concise and clear information from the massive amount of data generated, a computer system which is integrated into the communication and information network of at least both client and legal counsel is needed. The computer system, comprising hardware and software, is a depository for the baseline templates, compares the legal billing data to the activity and cost targets identified in the Strategic Plan, identifies variances to the plan, and determines the source of the variances. Further, the computer program tracks or monitors the schedule by which activities are actually completed and deliverables generated, and compares the actual schedule to the planned schedule. In summary, the computer system becomes the "engine" by which the control systems created by the Strategic Plan (i.e., cost, activity, and performance control systems) are implemented. As such, the computer software must necessarily become a critical part of the implementation of the legal strategic planning system and method of this invention.

The Strategic Planning Process may encounter unanticipated or discounted events (i.e., contingencies) as the legal matter or case progresses. Contingencies are events that signal opportunities to gain or lose strategic advantages. To the extent that the Strategic Planning Process has been thorough, the legal team will be able to take advantage of the situation. Contingencies, by their very nature, are either unpredictable or have been deemed to have a small likelihood of occurring, although their impact on the legal matter or case may be foreseeable. For example, the potential for a large verdict while any particular matter is being litigated may not be an event that counsel predicts. However, the fact that high verdicts can increase plaintiffs' attorneys' short term settlement expectations is a known effect. Effective planning factors into the equation the possibility of the current settlement climate. If such events are actually predictable, they should be dealt with as case issues during Structured Analysis.

Following Contingencies, the case development process proceeds to establish an Approved Plan. Where the contingency significantly affects the likelihood of achieving the desired outcome, or alters the nature of the case so that the initially determined legal theories may not apply, then the structured analysis step must be repeated. New long term goals are identified in view of the contingencies. If the long term goal, or outcome, is within the range of case resolutions acceptable to the client, a new strategic plan is developed based on the new long term goal, and the above Strategic Planning Process of this invention is repeated with the details of the new Strategic Plan replacing the details of the previous plan as the quality indicators for future legal activity/litigation management. In other words, the discrete, objective tasks, tied to process management of tasks, of those cases having achieved the desired outcome or long term goals become the paradigms from which future cases will identify as benchmarks or templates as to what constitutes quality legal services. These paradigms will provide the attributes for baseline templates outlining the objectives, milestones, deliverables, timing, and expected costs for new cases having similar desired outcomes and pursuing similar legal theories. As more and more cases become available for consideration as paradigms, templates may more accurately define the tactical attributes resulting in a higher confidence level or likelihood of realizing the desired outcome.

THE DEFENSENET™ SYSTEM

The system and process of this invention (hereafter the "DefenseNet" or System or Process) effectuates the legal business plan described supra and takes it two steps further by providing an interactive system which is responsive to unforeseen changes affecting the system, and by providing an iteratively converging, dynamically adaptive system whereby uncertainties associated with a "best practices" model or a stochastic strategic model are minimized with continued use. In other words, the system of this invention is an interactive strategic planning, cost control, and performance measurement system whereby the accuracy of a planned legal outcome, cost forecasts, and adherence to quality standards improves with iterative use and where such forecasts dynamically follow and adapt to the current prevailing legal climate. Tools critical to the implementation of the System and Process of this invention, and therefore included as elements of the invention, include a computer program and system for accumulating, reducing and reporting the information needed as a basis for the many informed decisions required in the execution and use of the Process and System of this invention. Further, the computer system is the conveyance by which the appropriate preliminary forecast is selected, and from which information critical to the completion of leveraged activities might be obtained.

In the system of this invention, historical case information is used from which paradigm cases reflecting well managed cases having successful outcomes for particular case types are identified and their attributes used as a "best practices" baseline template. In other words, for any given case category, case type or cause of action, and type of legal notification, historical case paradigms are identified having successful actual outcomes and case category and type consistent with the present action. Attribute information such as the objectives pursued and their timing, milestones achieved, and the deliverables produced is used to provide a template of the objectives, tasks and deliverables representing the "best practices" process for these paradigm cases. These templates are selected for a present case based on the present case's long term goal and case type. The template is merged with present case specific data, as well as with information of outside counsel or law firms selected to represent the client in the case, to provide a case specific strategic plan. The strategic planning system and process of this invention comprises an iteratively-converging, dynamically-adaptive, closed-loop strategic planning system and process, having integrated therein three (3) closed-loop control subsystems:

1. A litigation/legal control system whereby the timely completion of objectives and milestones is monitored and compared to the scheduled completion of predetermined objectives and tasks;
2. A cost control system, whereby the costs associated with the completion of each objective or milestone task are monitored and compared to the budgeted or target cost; and
3. A performance/bench marking control system whereby the deliverables associated with the tasks are monitored and compared to standardized benchmarks.

The objectives, tasks and their related deliverables associated with best practices template include those which historically have been shown to provide leverage so as to encourage the desired outcome of the case.

The DefenseNet Computer Program

The Strategic Planning System and process of this invention is the DefenseNet™ computer program. This computer program comprises three parts cooperatively and interactively working with one another to provide the "best practices" template database; to select the appropriate template, track actual costs against expected or planned costs; and to track and report performance benchmarks of legal tasks performed.

A) Questpath.

The first part of the DefenseNet computer program is a custodial software shell (QuestPath™) which is the artificial intelligence portion of the software, and limits access or functionality of the system in accordance with a predetermined security classification for each user of the system. The quality or type of reports may be reflected in the classification of the user with, for example, the president of the company receiving more strategic information than, say, a lower level, more operationally oriented, employee of the company. For example, through the initialization process described below, a high level officer of a corporation licensed to use the System and Process of the present invention will receive information that provides only the "big picture". An accountant in the corporation, on the other hand, will wish to review all of the "live" data necessary for him to perform his function.

As part of it artificial intelligence function, Questpath will "shake hands" with the other portions of the software program to provide, when appropriate, "pop-up" comments to remind, reprimand, or suggest actions or alternatives. Ideally, Questpath will determine the confidence level associated with the likelihood of achieving a desired legal outcome, and based on the case category, type, and venue, will also recommend a discovery strategy, and identify and recommend expert witnesses for the case. Questpath will also provide the interface by which secure electronic mail (E-mail), video-conferencing, and file transfers may be accomplished. Access to a bulletin board (BBS), or Internet may also be features accessible through Questpath.

B) LexPert.

In the second part of the DefenseNet computer program (LexPert™) a database is maintained containing profiles of subscribing law firms and attorneys, idiosyncracies of certain venues, courts and judges, case briefs from well managed cases, and expert witnesses, as well as other evidentiary materials that might prove useful in a legal action such as relevant treatises. LexPert may be connected to an on-line information service, such as Lexis-Nexis®, IDEX® or Dialog® to provide access to additional information on attorneys or other law firms as regards a specific legal issue or for information on additional legal resources. General information available through electronic search, "in context" or in summary form, of the LexPert portion of the DefenseNet database includes such items as:

Technical (e.g, medical), product and other expert witness data including full texts of deposition and trial testimony;

The effect or impact the venue may have on the matter or case;

Profiles of expert witnesses;

Technical literature research and standards of care;

Samples or explanations of the illustrative media and electronic documentation capabilities (videotaping and computer simulations);

Existing briefs on major legal issues requiring appellate challenge, including amicus briefs Jury instructions;

Technical, legal and risk management references;

Legislation and legislative initiatives directly affecting liability in each jurisdiction; and Administrative rules and policies affecting liability; and Development of discovery strategies, responses to discovery, and initialization of discovery.

C) Cost Core.

The third part of the DefenseNet computer program ("CostCore™") enables the crucial computer steps needed to implement the case development process. CostCore represents a key component of the system of this invention, without which manual implementation of the system would be impracticable. The CostCore program is fundamental to the formation of the strategic plan, the implementation of a cost management strategy, and establishing the performance monitoring and quality bench marking elements of the system of this invention. The functionalities provided by CostCore includes:

Receiving, storing and transmitting administerial information on law firms subscribing to the DefenseNet Service;

Receiving, storing and transmitting case specific data;

Receiving, storing and transmitting "clean" case histories and outcomes;

Providing the best-practices litigation/legal baseline template appropriate for the case;

Merging the case specific data with the legal or litigation baseline templates to provide a baseline strategic forecast having external or internal cost standards, for example task-based hourly regional averages established by regional counsel;

Tracking and reporting of legal tasks completed, actual costs, and deliverables produced;

Creation and identification of legal indicators and benchmarks; and

Providing easily accessible cost and performance data in graphical or tabular formats.

The structure of the DefenseNet program will enable executives and legal or claims managers to selectively access information and reports on individual cases and ranges of legal or litigation exposure in a format that enhances decision-making. Claims and legal personnel for the general counsel, business executives and financial officers can access data in a format matched to their function and to their needs. As a national network, lawyers and clients can simultaneously work on the same case data, or download DefenseNet program features for operation on a local PC or network.

Initialization

The system of this invention receives three kinds of data: initial data directed to the administrative and demographic particulars of each law firm subscribed to the system, case specific data relating to the present case, and case outcome feedback data from which future litigation/legal templates might be drawn.

The system of this invention provides a database of law firms from which a client, faced with possible or pending legal action may draw upon for legal support. The selection of a law firm will be based upon an objective analysis and weighing of the practice specialties offered by a firm, the historical costs of the services provided by the firm as compared to regional averages, whether the firm is plaintiff or defendant oriented, the attorney-billers that have been preapproved to bill for services provided, types of cases the firm is competent in handling, and the tasks and activities the firm has resources for and is prepared to undertake. Demographic data associated with the firm is also recorded such as the jurisdiction in which it is located, the legal theories available in that jurisdiction, and the courts available in that jurisdiction.

The second kind of data required by the system of this invention is case-specific data. This data is necessary in providing guidance in identifying tasks most likely to provide the leverage needed to realize the desired outcome, and includes:

a matter number by which the case may be tracked, the broad legal category in which the case lies (e.g., bankruptcy, construction, labor, intellectual property, etc.), the type of legal action applicable to the case (e.g., property damage, unlawful termination, infringement, etc.), the legal theories supporting the cause of action (e.g, fraud, breach of contract, infringement, negligence, tort, etc.), the level of notice associated with the case (i.e., is it confined as a client internal matter, as a possible lawsuit from an external third party, or in response to a filed lawsuit?), statement of the specific complaint the impact of the venue for the case, the relevant jurisdiction (i.e., federal, state, local), the judges available in the jurisdiction and their possible impact on the case, the name of opposing counsel, instructions as to how information regarding the case is to be routed (e.g., to Risk Management, to outside counsel, to a claims/legal department, to file, or to some other recipient), and estimates as to starting and ending dates of the legal actions contemplated.

The third type of data includes both on-going data by which performance and costs are tracked, and final outcome data wherein the results of the legal action are recorded. On-going data includes information directed to the completion of tasks, short term objectives (or milestones), costs associated with these tasks, time taken to complete the foregoing, and the deliverable produced for each task or milestone. These are measured against the predetermined target value for each as identified in the strategic plan. Using this data, both performance and cost can be tracked against the case budget and compared to regional average data of performance and costs. Finally, upon termination of the legal action, the final outcome is recorded by the DefenseNet System so that the outcome data may be reviewed to determine if the particular case may be established as a paradigm from which a new or modified baseline template might be created. thus maintaining the "best practices" baseline template database current and reflective of the currently prevailing legal climate.

Strategy and Time Forecast Templates

The DefenseNet program provides structured approaches and approach alternatives derived from recognized legal management experts in the form of general case plan and plan alternative templates. The DefenseNet program presents strategies directly relevant to the type of claim or claim conditions currently under consideration by the user. The DefenseNet computer program presents these strategies as baseline templates. These strategies are comprised of predetermined objectives and tasks to be executed in a predetermined order and pursuant to a predetermined schedule; essentially defining a process—a strategic planning process.

In addition to general strategies, near term objectives (milestones of progress) are presented as suggested "things-to-do" lists with time lines, target costs, expected deliverables, and report summary capabilities. The original data on which this is based can come from purchased data, cross-licensed data, many years of information from consenting clients or organizations, information from cooperating law firms and insurance carriers, and eventually, from all the growing data generated from system "online" users.

Examples of information available in the strategies portion of the system programs are:

Basic Exposure Analysis:
  Case valuation procedure based on injury
  Jury verdict research that applies to the specific claim;
  Settlement valuation procedures; and
  Expert witness locators.
Causation Analysis:
  Technical literature research guidelines on current positions in failure analysis, or medical probabilities vs. possibilities.
Damage Assessment:
  Economic loss analysis and evidence preparation;
  Non-impact emotional distress;
  Lost profits;
  Vendor and health care provider/rehabilitation expert locators.
Demonstrative Evidence Preparation:
  Guidance regarding vendors and their capabilities; and
  Samples or explanations of the illustrative media and electronic documentation capabilities (video taping and computer simulations).
Trial Preparation (through, for example, Jury Behavior Research data bank):
  Surrogate jury analysis;
  Discovery techniques and limitations;
  Focus group analysis results;
  Opening statement impact and restatement effects (textual treatises); and
  Witness selection and preparation (textual treatises).
Appellate Preparation:
  Existing briefs on legal issues requiring appellate challenge, including Amicus briefs, are downloadable as word processing files.
Plaintiff and defense case management tactics and techniques.
Verdict and settlement trends by region, state and county (through, for example, Jury Verdict Research, Inc.).

In addition, the DefenseNet program can present claims managers or their law firms with other forms of help to save time, reduce paperwork or to help keep in touch with their insurers. Such items include:

Automatic form generators for internal management reports or paperwork requirements for the insurer, especially financial management reports;
Access to computerized medical and legal literature services such as Lexis and Medlars; and
Compendia of shareholder health care operations guidelines, policies and procedures.

The best-practices approach may be based on a single case, an average of, or consensus, of cases, or selected from cases using a weighted average. The weight may be biased towards the results or outcomes of most recent cases, towards cases tried in the jurisdiction of interest, or by any other attribute deemed significant to the final case outcome.

Cost Management

A major element of the system and process of this invention is the cost management and control capability. The closed-loop cost management control system of this invention is responsive to the long stated need for an understandable, manageable legal cost accounting system. The elements of the cost accounting aspects of the invention includes:

Identification of the key tasks that make up the legal process;
Negotiation with the law firm of expected hourly ranges for key tasks;
Assigning cost targets to each;
Identify and approve personnel allocated to the case or matter;
Translation of a law firm's existing billing codes into CostCore codes and assigning to each key task a billing code;
Reports to client and law firm on performance.
Monitoring actual costs and identifying deviations (variance) from the budgeted cost;
Assigning ownership of the cost variances and providing a solution to correct the variance; and
Redefining the cost targets where the variance was due to an initial inaccurate estimate.

Performance Bench Marking

The strategic planning control system includes a performance monitoring and bench marking system by which legal productivity of the retained law firms may be measured. Performance of a law firm is assessed upon completion of a task and comparing the deliverable produced to a benchmark, or standard work product, that serves as an exemplar of the quality, scope, and caliber of work product expected. Comparison of the law firm's performance to the expected level of performance as defined by a regional average benchmark, provides the client a basis for requesting a write-down in the amount billed, or for awarding the law firm a bonus for exceptional performance.

Performance monitoring systems often fail because existing tools are not designed or used to measure performance, feedback is haphazard and, if given, is not timely, and because the feedback may inaccurately measure the performance. Working with legal counsel in the major geographic regions, project management under the inventive process will derive appropriate task based data. The resulting extensive national database will provide immediate assistance to users who will be new to the process and concepts.

A major constraint currently to demonstrating quality of services delivered is lack of comparative data. The DefenseNet program provides the essential data relationship among management of individual cases, a portfolio of cases and in relation to other network users as a Quality Bench Marking feature.

BEST MODE FOR CARRYING OUT THE INVENTION

The following detailed description illustrates the invention by way of example, not by way of limitation of the principles of the invention. This description will clearly enable one skilled in the art to make and use the invention, and describes several embodiments, adaptations, variations, alternatives and uses of the invention, including what is presently believed to be the best mode of carrying out the invention.

Referring now to FIG. 1, the computer controlled system of the invention is shown diagrammatically with the core of the system comprising the CostCore 1, LexPert 2, and Questpath 3 computer programs and associated addresses. These programs may be made available to the user via a computer usable medium including but not limited to: magnetic computer disks, CD-ROM, ROM memory, static RAM memory, as a set of files downloaded from a remote database, or any other computer readable form. The Questpath 3 program resides on both the subscriber's computer and law firm's computer system, and provides an applications shell which provides various levels of access in accordance with the security level assigned to the particular user. For example, the president of the subscribing company would have greater access to data and reports than someone much lower in the management hierarchy. The Questpath 3 program also guides the user as to accessing various features of the DefenseNet program. Its artificial intelligence capability enables it to recommend a discovery process and to facilitate discovery by interfacing with the LexPert 2 computer program when appropriate. The QuestPath computer program may intelligently provide "pop-up" reminders, reprimands, or suggestions when a variance from the Strategic Plan is encountered.

The CostCore computer program 1 resides on both the DefenseNet subscriber's computer system 4 and the law firm's computer system, and is the principle means by which the closed-loop Strategic Legal Activity/litigation Plan is generated, tracked and evaluated. The CostCore program 1 is initialized 5 with an inventory of "best practices" baseline templates. Sources of paradigm cases from which the "best practices" templates are derived include subscriber law firm file histories, records provided by subscriber clients, and the like. Once a particular case category and case type are inputted, a baseline template is suggested by the CostCore program from which to model a strategic plan.

Each law firm that participates in the DefenseNet program must be characterized so that basis may exist for selecting a particular law firm to represent a client. Accordingly, law firm information 6 including type of practice (plaintiff, defendant, or transactional), levels of expertise, billing rates, areas of practice and experience, as well as demographic variables such as location of the firm and jurisdiction is downloaded into the CostCore database. Note that downloading means 7, as well as uploading means 8 and 9, of information into the CostCore database may be effected by any means convenient to the administration of the database, including: electronic file transfers, keyboard, floppy disks, removable hard disks, and optical CD-ROMs, and the like.

The third component of the computerized control system is the LexPert program 2 and database which contains evidentiary resources that may prove useful in the event of litigation, and includes names and expertise of expert witnesses that have significantly contributed to the desired outcome in past cases, attorneys having special expertise, treatises, case briefs, and the like. Information may be downloaded via downloading means 10 during the course of litigation to provide insight as to the effect on the case that subjective variables, such as the judge in the case, jury behavior in this venue, and the like. As much information is uploaded into the LexPert database as is possible via uploading means 11. Additional data is uploaded on an on-going basis as cases close and the effect of witnesses and other variables thought to be useful in future cases are made available. Further, third party information resources such as Lexis®, IDEX® or Dialog® may be made available to subscribers as a pass-through service.

Once notification 12 is delivered to the DefenseNet subscriber, case specific data is downloaded via downloading means 13 to the CostCore program 1, in particular, the long term goal or outcome desired and the type of case (e.g., breach of contract, wrongful termination, infringement, etc.) is downloaded to the CostCore program. Other case specific information may optionally include the client's matter number (for tracking purposes); a name for the case; legal category, subcategory and type of action; at least one legal theory upon which to base a cause of action; a description of the claim against or made by the DefenseNet subscriber. The case specific information is merged with a baseline template to provide a model legal/litigation strategic plan.

The baseline template is based on "best practices", as determined by the outcome of paradigm case histories. The parameter values (e.g., long term goal, case type, theories set out, and the like) of these cases are selected as models for the baseline templates. Definition of the tasks to be performed and the deliverables to be produced are derived from these paradigm cases. Task timing and costs are preferably derived from regional average values. Note that the baseline template ideally is one where the strategic plan will result in a maximum likelihood of attaining the desired outcome while at the same time minimizing the magnitudes and limits of the random deviations due to uncontrolled or unknown variables. As such, an alternate preferred embodiment of the strategic planning system of this invention would use a baseline template based on stochastic modeling techniques. Such a model would provide the added information of a calculated percent probability of achieving the desired outcome and permit defining confidence intervals around such a projection. This added information is useful where the risk of not achieving the desired outcome is a factor in selecting the baseline template.

Another alternate preferred embodiment of the strategic planning control system of this invention employs max/min techniques. These techniques are well suited for selecting between variables having discrete values (i.e., attribute variables) as compared to continuously variable values. Techniques such as transportation modeling, distribution models, and resource allocation modeling may be used in the creation of baseline templates to identify the combination of tasks and their associated timing that will provide the maximum likelihood of achieving the desired outcome, while at the same time minimizing the risk of failure for each task. These techniques are well known by persons of ordinary skill in the art of operations research.

Three interrelated closed-loop control systems are defined by the strategic planning system of this invention. These include 1) a legal/litigation control system 14 wherein tasks and milestones to be achieved by time(s) certain are monitored and measured against the tasks and milestones schedule defined in the strategic plan; 2) a cost control system 15 wherein compliance with the cost targets and budget is monitored; and 3) a performance bench marking control system 16 wherein the production of deliverables is measured against the target deliverable defined in the strategic plan.

Note that the software program of this invention is "multi-threaded" in that it is capable of handling a plurality of cases simultaneously. The cases need not be related, however, if the cases are related, such a relationship may be provided for by "linking" tasks, activities, and costs, or other aspects of the strategic plan, in one case with those of another.

Figure 2:
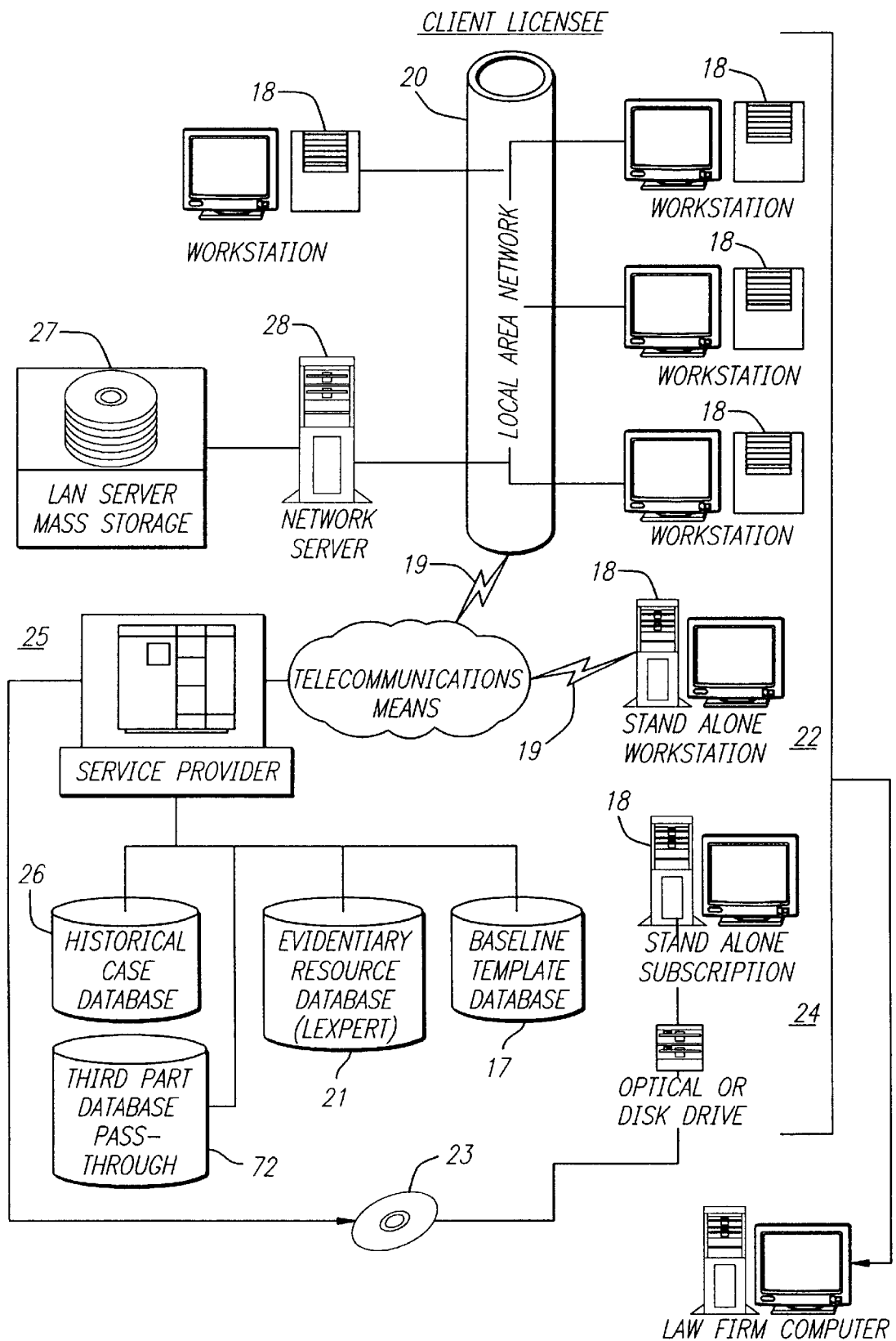
FIG. 2 illustrates the relationship of the Service Provider with that of the clients subscribing to the system of this invention.

The relationship between the DefenseNet service provider and clients is shown in FIG. 2. The baseline template database 17 may be provided to the client with the CostCore program. However, as the evidentiary resource database 21 is extensive, this data is stored at the DefenseNet service provider site. The database may be stored on magnetic disks, in microfiche, optical disk, RAM, ROM and other media commonly known to be capable of storing data.

The CostCore 1, 2, and Questpath 3 computer programs, as well as the baseline template database 17, are locally loaded onto the clients' computers 18. Access to the evidentiary resource database 21, and to external databases 72 such as Lexis®, Idex®, or Dialog® is preferably effected by electronic transfer means 19 of files by microwave, telephone, T1 lines, or optical cable. A networked client 20 is able to gain access to the evidentiary resource database 21 from multiple computer terminals 18 at a site. This is particularly useful where several legal actions may be on-going. A larger client 28 may wish to download information related to his industry into a local data storage device 27. For example, a health maintenance organization may wish to periodically download all expert witnesses, articles, case briefs, and the like related to medical malpractice into its LAN server mass storage device.

A stand-alone client 22 is also able to access the evidentiary resource database 21 or be passed through t o a third party information provider 72, thus receiving the same level of service and accessibility as a much larger client. Alternately, another preferred method for access to the database is by providing a subscription to baseline template database updates on a CD-ROM, disks, or other storage media 23, that are updated, for example, once per quarter. However, a standalone system 24 that is incapable of electronic communication with the service provider will not be able to make use of the evidentiary resource database 21.

The outcome of each case may be uploaded to the service provider systems's 25 historical case database 26 thus contributing to the pool of information available to the service provider for the creation of new templates or for modification of existing templates, or for enlarging the evidentiary resources database 21. Alternately, the actual outcome may be communicated by disk or other transportable data storage means, or in written text, to DefenseNet for importation into the databases.

Figure 3:
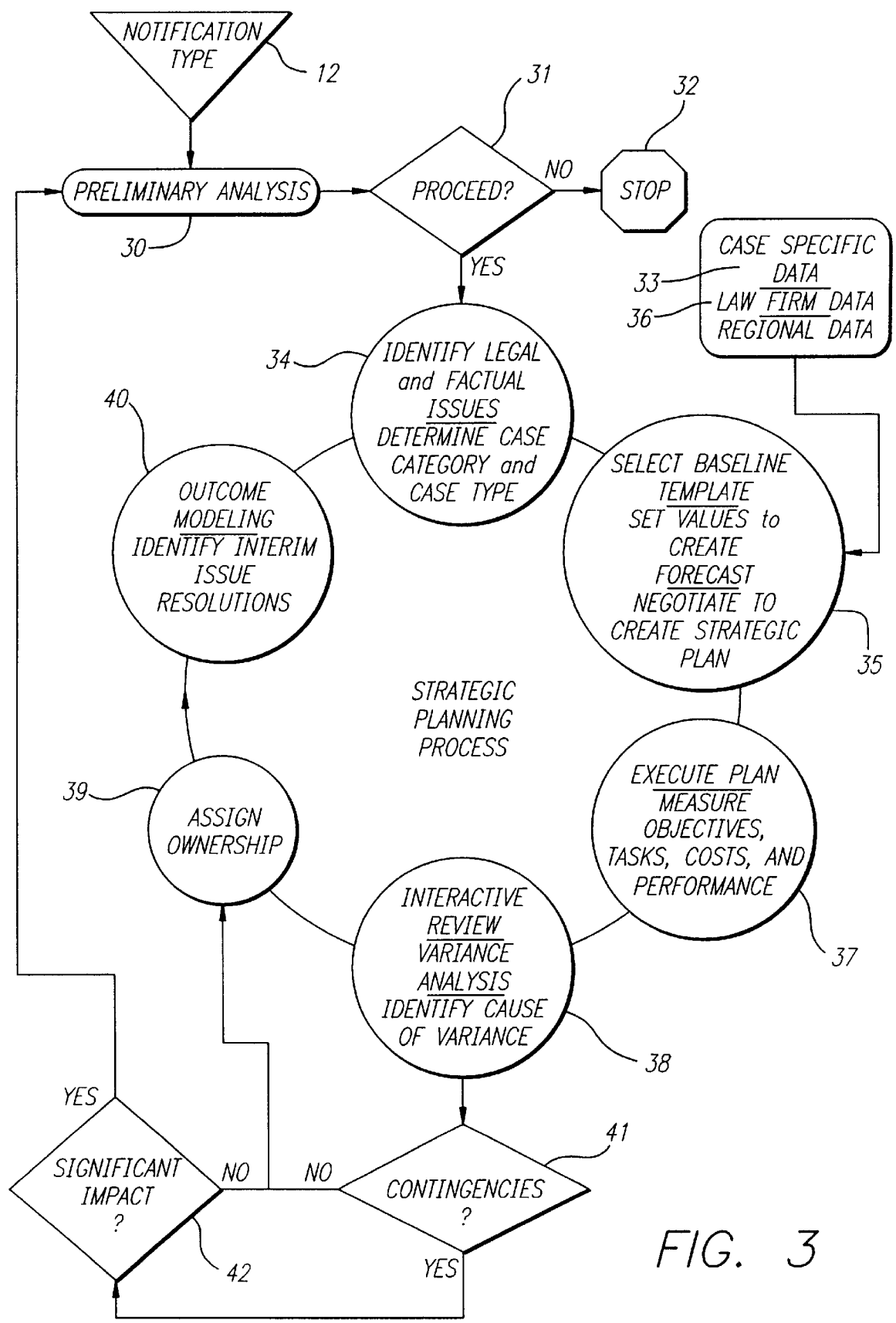
FIG. 3 shows the flow diagram for the Strategic Planning Process of the Legal Strategic Analysis Planning and Evaluation System of this invention.
Figure 4:
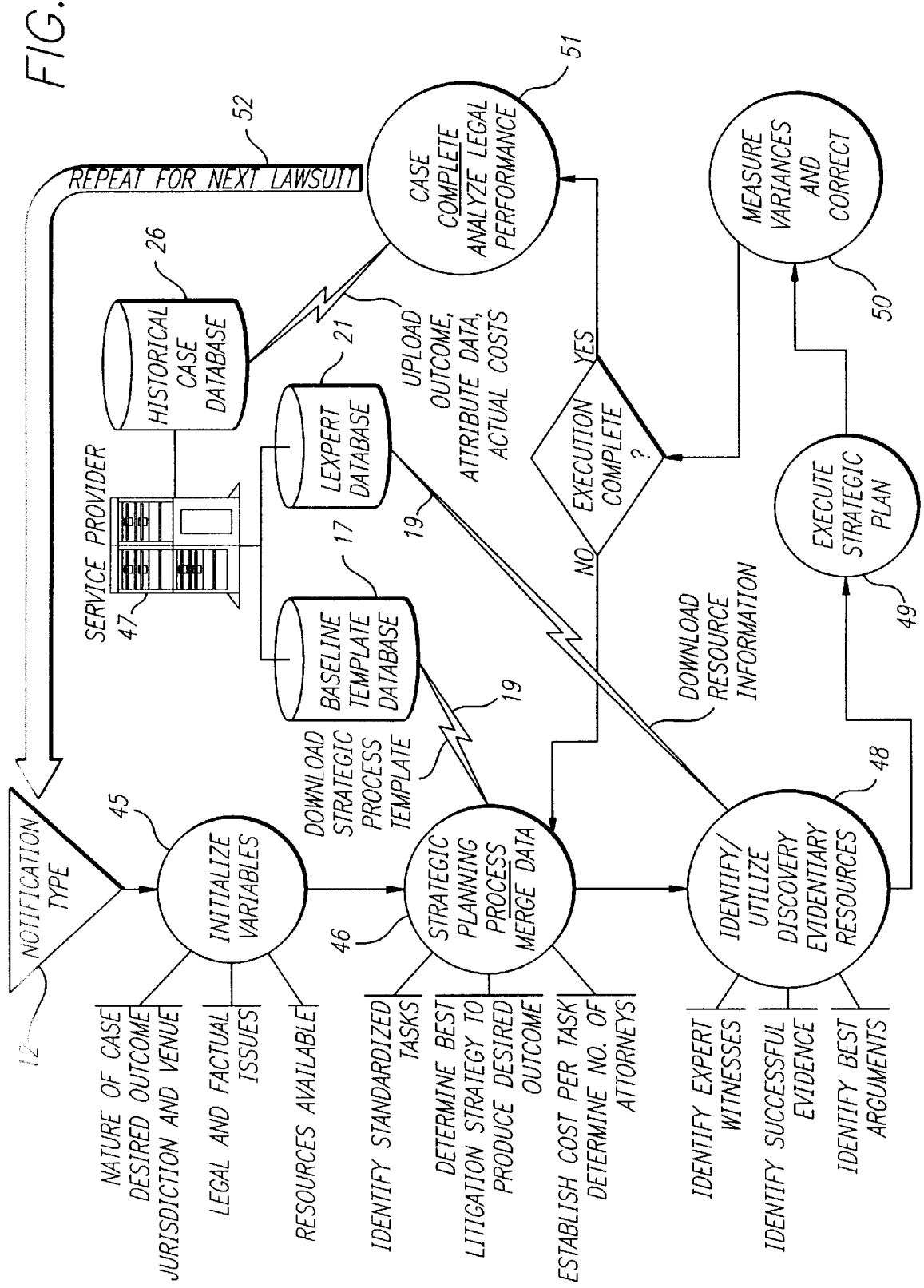
FIG. 4 shows a high level systems diagram of the Legal Strategic Analysis Planning and Evaluation System of this invention.

The Strategic Planning process 29, as see in FIG. 4, of this invention is shown in FIG. 3. Upon notification 12 of a possible or pending lawsuit, a structured or preliminary analysis 30 of the facts of the case is performed for the purpose of identifying facts sufficient to support a legal cause of action, and that will also permit a gross estimate of damages to determine what the case is worth. The facts are also examined with an eye to any extraordinary parameters that may distort or alter a verdict or the value of the case. The result of the preliminary analysis is a rough determination of the amount of liability or award (the long term goal), a rough estimate of the settlement value of the case, and an approximate time horizon as to the duration of the case. This information constitutes the case specific data 33. Based on the results of the preliminary analysis, a decision 31 is made to either go forward with legal action or to stop 32 and settle the case.

In the event of a decision to go forward with legal action, a Strategic Plan is developed. The legal issues and factual issues 34 are clarified, a case category and case type are identified, and the rough estimate of liability or damages is redefined into a statement of the desired outcome or long term goal. Based on the case category and the case-type, a "best practices" template 35 comprising objectives, tasks and milestones to be completed during the course of the legal action, a timetable for each objective, task or milestone, their deliverables, and a cost target for completing each objective, task or milestone is provided. The template is originally derived from and is continually updated from an evaluation of well-managed cases whose histories have been recorded by the service provider. This constant updating of the baseline templates by analysis of contemporary cases makes the strategic planning system and process of this invention dynamically adaptive to changes in the legal climate. These cases are used as paradigms and the attributes of the litigative process that characterizes these cases provide the baseline templates for those later new cases having case categories and case types similar to the paradigm case.

Target values as to timing, costs and deliverables are established 35. The case specific data 33 is merged with the template to provide a preliminary forecast for this case. Law firm data 36 including the billing rates, resources, expertise, and legal practice categories of the law firm(s) retained by the client are also incorporated into the Strategic Plan to the extent that only approved billers may bill against the account, and specific attorneys are identified with the levels of expertise required by the Strategic Plan. Subsequently, the kinds of tasks, the appropriateness of timetables, and legal cost targets detailed in the forecast may be modified to reflect unique or unusual aspects of the case. Once the target values have been established and the forecast approved by all parties (e.g., law firm and client ), the forecast becomes the Strategic Plan for this particular legal action.

Legal activities commence 37 upon approval of the Strategic Plan by both the client and the law firm(s) and the strategic process (defined by the orderly completion of a series of tasks pursuant to a predetermined time schedule) is executed. Three control systems, built into the Strategic Plan, operate to ensure that the elements of the plan are followed: a legal/litigation control system, a cost management control system, and a performance control system. Each control system provides closed-loop control of one of the three elements of the Strategic Plan. The legal/litigation control system monitors all tasks, objectives, and milestones to ensure that they are completed in the time allotted. The cost management control system monitors the actual legal costs associated with the legal activities, and compares them to the budgeted cost. Optionally, the performance control system monitors the production of deliverables associated with the tasks and activities to ensure that they are produced in a timely manner.

An interactive review 38 of the actual data associated with the completion of the schedule of tasks, the costs, and the deliverables produced is performed. Deviations (i.e., variances) between the target values and the actual values are ascertained. In all three control systems the actual schedules or costs are compared to the planned schedules or costs. Variances between the actual and planned schedules are noted and causes for the variances identified. Ownership of the variances is assigned 39 in that those persons responsible for adherence to the targeted values are tasked to determine the underlying causes for the variances. Once the underlying causes are identified and resolved, the impact of the variances to the Strategic Plan is assessed and the outcome of the case is reviewed 40. The causes for the variances are corrected, and the remaining planned schedules and costs adjusted, if necessary. Additionally, the initial issues are tested in view of any impact to the outcome that may have been determined. The appropriateness of the original template is verified, and new targets defined if necessary in view of any unresolved variances. The entire closed-loop process is repeated until the case is concluded.

A contingency 41 may occur that may represent a significant impact to attaining the long term goal of the case. A contingency is significant if the Strategic Plan is no longer applicable. While FIG. 3 shows the contingency 41 as being identified during the interactive review 38 step, in fact, a contingency may be identified at any node (circle) in the closed-loop strategic planning process 29. A preliminary assessment and decision 42 is made to determine if the contingency has a significant impact on the outcome of the case. If so, the entire strategic planning process 29, plus the preliminary analysis 30 and decision to proceed 31 steps performed prior to the closed-loop strategic planning process, is repeated.

Standardized codes (preferably adopted from the ABA) for tasks and activities are used to define the objectives, tasks, and activities. See for listings and definitions for the ABA Model Litigation Codes. The use of standardized codes will ensure uniformity in comparing actuals to planned, or to regional average values for the same coded task or activity. Also, the use of such codes also ensures that a comparison of time schedules for each task or activity to a regional average schedule is a meaningful comparison.

A high level system diagram providing an overview of the of the Legal Strategic Analysis and Planning Control Process of this invention is shown in FIG. 4. Once notification 12 is given, and it has been determined that a lawsuit is likely or has started, and a decision 31 has been made to proceed with legal action, the first step, initialize variables 45, involves making specific the details of the case, selecting the law firm to represent the client, and defining the long term goals, case category, and the case type. The second step, the Strategic Planning Process 29, has been described in detail supra and includes selecting the appropriate baseline template based on the previously defined case category and case type. A computer 25 and baseline template database 17 determines and provides the appropriate templates. See FIG. 2. The initialized data defined in the first step is merged with the template to provide the Strategic Plan. Evidentiary resources 48 are consulted via computer and a transmission means 19, or alternately frequently-used information may be downloaded onto the client's own data storage system, to provide or suggest sources of evidence that may prove useful in moving the case towards the long term goal.

The strategic plan is executed 49, variances to the target values are identified and corrected 50, and the case moves to a final outcome 51. The results of the case outcome are communicated via a transmission means 19(e.g., modem, wide area network, diskettes, questionnaire, microwave link, and the like) to the Service Provider's computer 25. This information is subsequently stored in a case histories database 26 for possible later review.

The diagram in FIG. 4 clearly illustrates the iterative convergence and dynamic tracking capabilities of the system. The iterative convergence feature relates to the on-going feedback from the client to the Service Provider, of the outcomes and attributes of specific cases. These data are stored in a historical database 26 for analysis by the Service Provider and for a determination of whether a just-completed case qualifies as a paradigm from which a baseline template is either modified or created. This modified or new baseline template is used for the next case 52 having a long term goal and case-type similar to the new paradigm. In this respect, the baseline template database is refined and expanded with each iteration of cases using the system of this invention. Accordingly, with each iteration, better baseline templates become available for future cases. The templates are better in that the strategies defined by existing templates are either corroborated or are refined, thus increasing the likelihood of achieving the desired outcome, or the new template may be more appropriate than an existing template for a particular case category or case type.

The system shown in FIG. 4 dynamically tracks the prevailing legal climate in that baseline templates derived from newly identified paradigms will continuously cull out older, perhaps obsolete, existing templates. By continually refreshing the database of base-line templates with modified or new templates, any shifts in the prevailing legal climate (e.g., policy changes regarding stress in the workplace, courts favoring patentees or accused infringers, or the like) will automatically be reflected in the paradigm's strategy contained in the modified or new baseline templates.

Figures 1, 5:
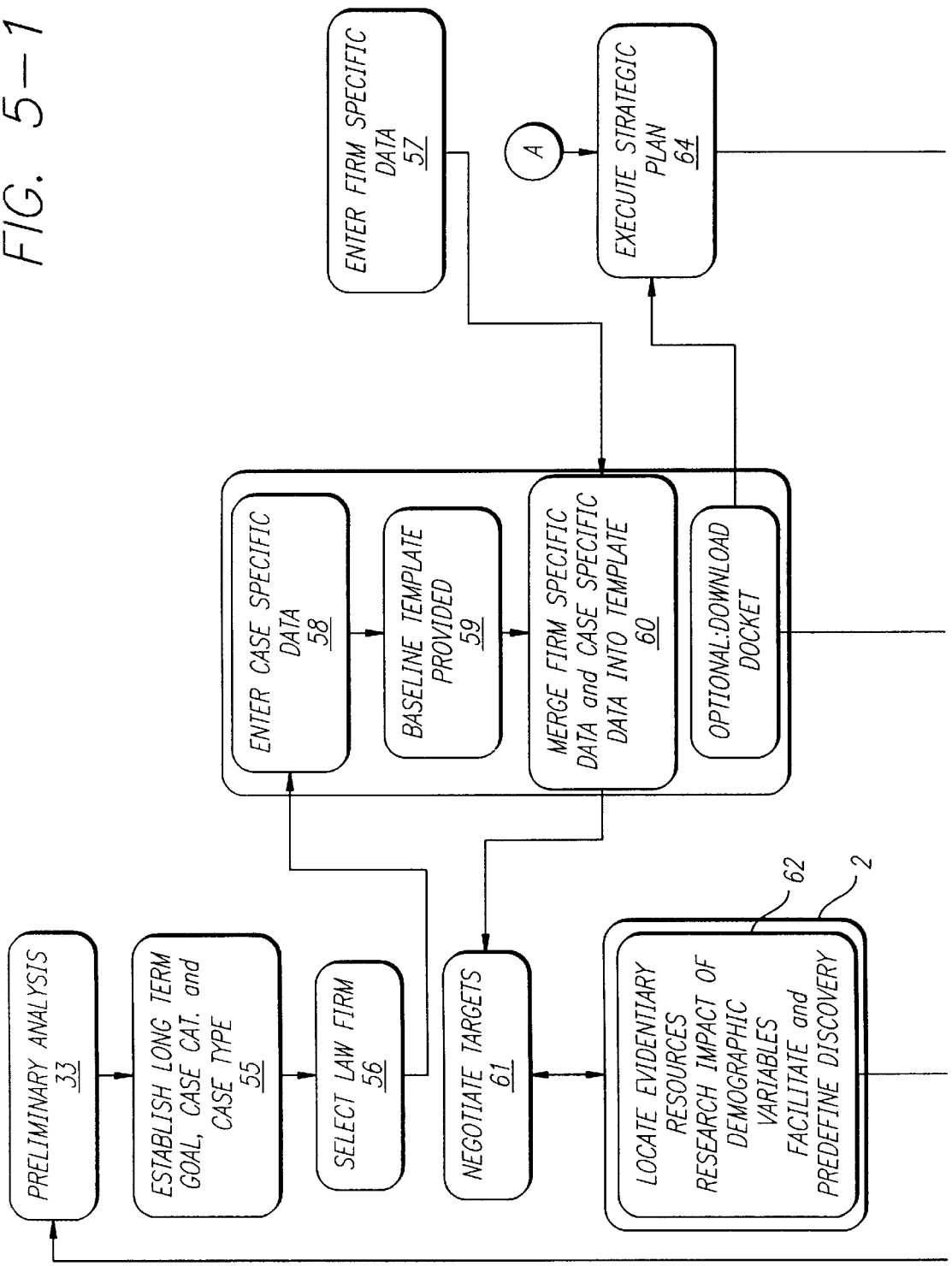
FIG. 5 shows a detailed flow chart of the Legal Strategic Analysis Planning Process of this invention and the relationships between the computer programs, the client, and law firm.
Figures 2, 5:
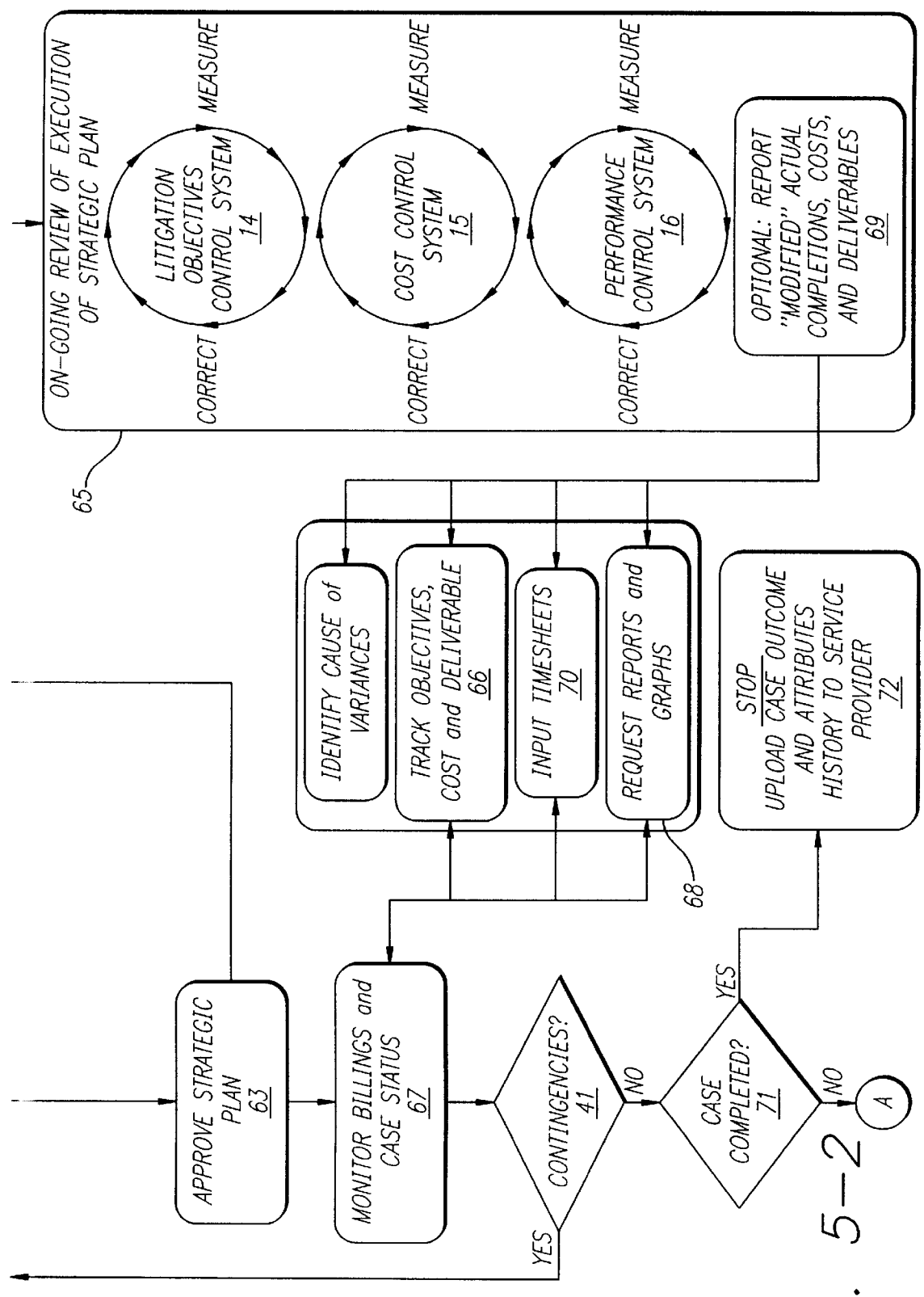

A more detailed diagram of the Legal Strategic Analysis Planning process is shown in FIG. 5. More particularly, the relationships between the law firm, client and computer programs/databases is shown. Following the preliminary analysis step 30 and decision to proceed with the case, the long term goals and case type are defined 34. These steps are described supra with reference to FIG. 3. A law firm is selected 56 by the client to represent them in this case. Specific information on the selected law firm 36, if not already entered into the CostCore program 1, is inputted 57 to the CostCore program 1. This information includes the practice areas of expertise, whether the firm is plaintiff or defendant oriented, the various levels of attorneys and staff, their billing rates, a list of approved billers, and a list of task and activities that may be undertaken by the firm (preferably based on the ABA Model Litigation Code Set).

At this time, the client also enters 58 data specific to the present case 33 into the CostCore program. This data includes the name and/or matter number of the case, the case category and type, the relevant legal theories upon which a legal cause of action might be brought or upon which a counterclaim or defense filed or asserted, the description of the claim, the relevant jurisdiction, the courts in the jurisdiction, names of opposing counsel, estimates as to the starting and ending dates for the case, and routing information as to who will receive communications regarding the case. The client selects a baseline template 59 based on their case category and the case type. The case specific data and law firm specific data are merged 60 into the template to provide an initial forecast, or preliminary strategic plan, of the objectives and tasks to be completed, the timing for their completion, target costs, and expected deliverables.

At this time or at any other time in the process, the LexPert™ program 2 and database 21 may be accessed to identify evidentiary resources 48 (FIG. 4) and other information that may be useful in the case 62. Additionally, the LexPert program 2 may include an analysis of the preliminary strategic plan to determine if there are any aspects of the strategic plan that might impede progress towards achieving the desired outcome. Such feedback may occur as a report after the case specific data is entered, or as "pop-up" messages flagging the user to a potential impediment may exist as the case specific data, law firm data, or evidentiary data is entered. The timing and cost targets, as well as the expected deliverables and tasks are negotiated 61, and a final strategic plan is approved 63 by the client and law firm.

The strategic plan is executed 37, principally by the law firm. During execution of the strategic plan, closed-loop control systems 65 are established where by the completion of objectives per the agreed upon schedule 14, the costs accrued to date 15, and the deliverables are measured 16, variances identified and resolved 37, 38 and 39 (see FIG. 3), and target values for these parameters re-defined.

It is a very important advantage of the invention that while these control systems may jointly involve both client and law firm, in advance of the client, will review the measured data and itself perform most of the corrections to the identified variances prior to uploading the results (i.e., objectives completed and when, costs accrued by objective or task, hours billed by objective or task by attorney, and deliverables produced) to the CostCore program. Accordingly, these "modified" results 69 which may reflect write downs of the cost by the law firm for objectives not yet met, costs exceeding target, excessive hours billed for tasks completed, or for deliverables not meeting benchmark standards are communicated to the CostCore 1 program. The client is able to track or monitor 66 the completion of objectives, costs, and performance by accessing the Law Firm's CostCore program 1 and download the information. The law firm or client will also input time sheets 70 from which actual billings are calculated, monitor billing status 67 and request reports or graphs 68. It is the combination of task based billing with associated target values, defining the legal/litigation as a process executed pursuant to a strategic plan, and the CostCore and LexPert programs that enable the creation of the closed-loop legal/litigation, cost, and performance control systems.

As discussed above, contingencies 41 may occur which might significantly affect the likelihood of attaining the long term goal. In that event the entire case is reviewed by repeating the process beginning with the preliminary analysis step 30 to determine if there is a change in the long term goal or the case type. In that event, the baseline template may have to be changed to reflect the new long term goal and the case type, thus requiring restarting the strategic analysis procedure.

Once the case is completed 71, the outcome of the case and the attributes which characterize the case may be uploaded 72 to the Service Provider's computer system for consideration as a paradigm.

It should be understood that various modifications within the scope of this invention can be made by one of ordinary skill in the art without departing from the spirit thereof. For example, the activities, dates and attorneys associated with each task or activity of the strategic plan may be made downloadable to a calendaring or docket system, to work in cooperation with the docketing or calendaring system. We therefore wish our invention to be defined by the scope of the appended claims as broadly as the prior art will permit, and in view of the specification if need be.

We claim:

1. An outcome-oriented, closed-loop legal strategic planning and control system comprising in operative combination:

a) a service provider having a first computer system, said first computer system having a central processing system, a memory storage means, and a telecommunications means, said first computer system further comprising:

i) a historical legal case database, said historical legal database containing attribute data on completed paradigm legal cases, ii) an evidentiary resources database containing therein information to be used in the preparation and prosecution of a legal action, iii) a baseline template database having therein baseline templates for the execution of a legal process, said baseline templates further comprising objectives, tasks, and activities predetermined to provide the maximum likelihood for a desired legal outcome, and costs and schedules associated with said objectives, tasks and activities, and iv) a service pass-through means to permit access to third party databases, said third party databases containing information supplemental to information contained in said historical case database and said evidentiary resources database;

b) at least one client service subscriber, said service subscriber having at least one second computer system, said second computer system having a central processing system, a memory storage means, a display means, and at least one of a telecommunications means, optical disk drive, magnetic disk drive, and flash memory;

c) at least one law firm subscriber, said law firm subscriber having at least one third computer system, said third computer system having a central processing system, a memory storage means, a display means, and at least one of a telecommunication means, optical disk drive, magnetic disk drive, and flash memory;

d) a computer readable program code system accessible by said first computer and said second computer, said computer code further comprising:

i) a first computer readable program code subsystem for configuring said second and said third computer systems to perform in any operational order at least one of accepting the keystroke entry of a user identification and password by the user of said computer readable program code system, accepting by user keystroke entry the selection of a task to be performed by said second or third computer system including at lest one of the activation of a second or third computer readable program code subsystem, interfacing to telecommunications for downloading, uploading and for access to external computer readable database and computer applications, and for providing automatic reminders or suggestions to the user upon the occurrence of a set of predetermined conditions, ii) a second computer readable program code subsystem for configuring said second and said third computer systems for at least one of entry of a first set of case-specific data and a second set of law firm-specific data, for determining and for providing a preliminary forecast of tasks and activities based upon entry of said case specific data, for providing projected costs for said tasks and activities, for permitting modification of said tasks, activities, and costs, for permitting entry of actual costs and completion dates of said tasks and activities, for permitting downloading and uploading of said actual costs and completion dates to said third computer system, for permitting transfer of updated baseline templates from said baseline template database of said first computer system to said memory storage means of said second computer system, and for transferring completed case information to said historical database of said first computer system, iii) a third computer readable program subsystem for configuring said second and said third computer systems to permit access to at least one of said evidentiary resources database of said first computer system, and to said third party database.

2. Method for an outcome-oriented, closed-loop legal strategic planning and controls system comprising the following steps in any operative order:

a) providing a service provider having a first computer system, said first computer system having a central processing system, a memory storage means, and a telecommunications means, said first computer system further performing the steps of:
   i) providing a historical legal case database, said historical database containing attribute data on completed paradigm legal cases,
   ii) providing an evidentiary resources database containing therein information to be used in the preparation and prosecution of a legal action,
   iii) providing a baseline template database having therein baseline templates for the execution of a legal process, said baseline templates further comprising objectives, tasks, and activities predetermined to provide the maximum likelihood for a desired legal outcome, and costs and schedules associated with said objectives, tasks and activities, and
   iv) providing a service pass-through means to permit access to third party databases, said third party databases containing information supplemental to information contained in said historical case database and said evidentiary resources database;

b) providing at least one client service subscriber, said service subscriber having at least one second computer system, said second computer system having a central processing system, a memory storage means, a display means, and at least one of a telecommunications means, optical disk drive, magnetic disk drive, and flash memory;

c) providing at least one law firm subscriber, said law firm subscriber having at least one third computer system, said third computer system having a central processing system, a memory storage means, a display means, and at least one of a telecommunication means, optical disk drive, magnetic disk drive, and flash memory;

d) providing a computer readable program code system accessible by said first computer and said second computer, said computer code performing the steps of:
   i) configuring said second and said third computer systems with a first computer readable program code subsystem for performing in any operational order at least one of the steps of: accepting the keystroke entry of a user identification and password by the user of said computer readable program code system, accepting by user keystroke entry the selection of a task to be performed by said second or third computer system including at least one of the activation of a second or third computer readable program code subsystem, interfacing to telecommunications for downloading, uploading and for access to external computer readable databases and computer applications, and for providing automatic reminders or suggestions to the user upon the occurrence of a set of predetermined conditions,
   ii) configuring said second and said third computer systems with a second computer readable program code sybsystem for performing in any operational order at least one of the steps of: entering a first set of case-specific data including at least case type and case category, entering a second set of law firm-specific data including authorized billers and billing rages, determining and providing a preliminary forecast of tasks and activities specific to the case category and case type based upon entry of said case-specific data, providing projected costs for said tasks and activities, modifying said tasks, activities, and costs, entering actual costs and completion dates of said tasks and activities, downloading and uploading of said actual costs and completion dates to said third computer system, transfering updated baseline templates from said baseline template database of said first computer system to said memory storage means of said second computer system, and transferring completed case information to said historical database of said first computer system,
   iii) configuring said second and said third computer systems with a third computer readable program subsystem to permit accessing at least one of said evidentiary resources database of said first computer system, and said third party database.

3. Method for a legal strategic planning and control system as in claim 2 further comprising, in any operative sequence, the steps of:

a) performing a preliminary analysis upon notification of an event having potential or actual legal repercussion, said preliminary analysis including a gross estimate of the value of a legal action in response to said event and identifying sufficient factual basis to support proceeding with said legal action;

b) identifying the factual and legal issues in the case, and determining from those issues the case category and case type;

c) entering into said second computer readable program code subsystem case specific data including the case category, case type, and type of legal notification into said second computer readable program subsystem;

e) entering into said second computer readable program code subsystem law firm-specific data including authorized billers and their billing rates;

f) selecting the appropriate baseline template appropriate to the case category, case type and the legal notification type, said selection being provided by said second computer readable program code based upon entry into said second computer readable program subsystem of the case category and case type, g) merging said case specific data and said law specific data with said baseline template to provide a preliminary forecast, said preliminary forecast containing a list of objectives, tasks, and activities, their schedule and expected costs for said objectives, tasks and activities;

h) obtaining consensus on and optionally modifying said list of objectives, tasks and activities, and their schedule and costs to produce a legal strategic plan wherein agreed upon objectives, tasks, activities and costs are established;

i) executing the objectives, tasks, and activities of said legal strategic plan, and entering into said second computer readable code subsystem the actual completion dates and costs of said objectives tasks and activities,;

j) comparing the actual completion schedule and costs with the agreed upon schedule and costs in the legal strategic plan;

k) identifying any variances between the actual schedule and costs as compared to the agreed upon schedule and costs, l) performing a causation analysis to determine the source of any variances identified;

m) mitigating the source of variance;

n) perform an outcome modeling analysis to determine if the original assumptions are still true and if the elements of the legal strategic plan are still appropriate, and o) continuing execution of the strategic plan including comparing actual schedules and costs of said objectives, tasks, and activities, performing a variance analysis, and mitigating any variances, said continuing execution creating a cost control system for on-going, real time cost management, and a litigation control system for on-going, real-time management of schedules and deliverables.

4. Method for a legal strategic planning and control system as in claim 3 further comprising, in any operative sequence, the steps of:

a) identifying contingencies; and b) ascertaining whether said contingencies have a significant impact to the case.

5. Method for a legal strategic planning and control system as in claim 3 further comprising, in operative sequence, the steps of:

a) accessing said evidentiary resources database of said first computer system to identify expert witnesses, best arguments for the case, and to identify the kinds of evidence successfully used in prior cases.

6. Method for a legal strategic planning and control system as in claim 3 further comprising, in operative sequence, the steps of:

a) uploading case information from said second computer readable code subsystem to said historical information data base of said first computer system, said uploaded data being stored in said historical database for consideration as a paradigm on which to build a baseline template to provide and iteratively converging closed loop legal strategic planning and control system.

7. Method for a legal strategic planning and control system as in claim 6 further comprising, in operative sequence, the steps of:

a) updating the said baseline template database of said first computer system with contemporary baseline templates developed from recent case paradigms to provide a dynamically adaptive closed-loop legal strategic planning and control system.

8. A computer useable medium having a computer readable program code means embodied therein for causing the creation of a legal strategic plan and the implementation of a closed-loop, iteratively converging, and dynamically adaptive legal strategic planning and control system, the computer readable code means in the computer program product comprising:

a) a first computer readable program code means for configuring a second computer system located at a service subscriber site and a third computer system located at a law firm to perform in any operational order at least one of accepting the keystroke entry of the user identification and password of the user of said computer readable program code system, accepting by user keystroke entry the selection of a task to be performed by said second or third computer system including at least one of the activation of a second or third computer readable program code means, interfacing to telecommunications for downloading, uploading and for access to external computer readable databases and computer applications, and for providing automatic reminders or suggestions to the user upon the occurrence of a set of predetermined conditions;

b) a second computer readable program code means for configuring said second and said third computer systems for receiving entry of at least one of a first set of case-specific data and a second set of law firm-specific data, for determining and for providing a preliminary forecast of tasks and activities based upon entry of said case specific data, for providing projected costs for said tasks and activities, for permitting modification of said tasks, activities, and costs, for permitting entry of actual costs and completion dates of said tasks and activities, for permitting downloading and uploading of said actual costs and completion dates to said third computer system, for permitting transfer of updated baseline templates from a baseline template database of a first remote service provider's computer system to a memory storage means of said second computer system, and for transferring completed case information to said historical database of said first computer system; and c) a third computer readable program code means for configuring said second and said third computer systems to permit access to at least one of said evidentiary resources database of said first computer system, and to a third party commercial database.

9. A program storage device, readable by a machine, tangibly embodying a program of instructions executable by the machine to perform method steps for the creation of a legal strategic plan and for implementing a legal strategic planning and control system, said method steps comprising:

a) configuring a second service subscriber's computer system and a third law-firm's computer system with a first computer readable program code subsystem for performing in any operational order at least one of the steps of: accepting the keystroke entry of the user identification and password of the user of said first computer readable program code subsystem, accepting by user keystroke entry the selection of a particular task to be performed by said second or third computer system including at least one of the activation of a second or third computer readable program subsystem, interfacing to telecommunications for downloading, uploading and for access to external computer readable databases and computer applications, and for providing automatic reminders or suggestions to the user upon the occurrence of a set of predetermined conditions;

b) configuring said second and said third computer systems with said second computer readable program code subsystem for performing in any operational order at least one of the steps of: entering a first set of case-specific data including at least case type and case category, entering a second set of law firm-specific data including authorized billers and billing rates, determining and providing a preliminary forecast of tasks and activities specific to the case category and case type based upon entry of said case specific data, providing projected costs for said tasks and activities, modifying said tasks, activities, and costs, entering actual costs and completion dates to said third computer system, transfering updated baseline templates from a baseline template database of a first service provider's computer system to a memory storage means of said second computer system, and transferring completed case information to a historical database of said first computer system;

c) configuring said second and said third computer systems with said third computer readable program code subsystem to permit accessing said historical database, an evidentiary resources database, and said baseline template database of said first computer system, and a third party commercial database.

* * * * *